(12) United States Patent
Tiwari et al.

(10) Patent No.: US 8,949,411 B2
(45) Date of Patent: Feb. 3, 2015

(54) DETERMINING WHETHER A DEVICE IS INSIDE A NETWORK

(75) Inventors: Abhishek Tiwari, Andhra Pradesh (IN); Rama Krishna Amaravadi, Andhra Pradesh (IN); Raunak Pandya, Andhra Pradesh (IN); Alok Jain, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 361 days.

(21) Appl. No.: 12/970,298

(22) Filed: Dec. 16, 2010

(65) Prior Publication Data

US 2012/0158944 A1  Jun. 21, 2012

(51) Int. Cl.
*G06F 15/173* (2006.01)
*H04L 29/12* (2006.01)

(52) U.S. Cl.
CPC .................................. *H04L 61/2007* (2013.01)
USPC ............................ 709/224; 709/225; 709/226

(58) Field of Classification Search
USPC .......................................... 709/224, 225, 226
See application file for complete search history.

(56) References Cited

U.S. PATENT DOCUMENTS

| 6,021,429 | A * | 2/2000 | Danknick ...................... 709/208 |
| 7,542,468 | B1 | 6/2009 | Begley et al. |
| 7,930,428 | B2 | 4/2011 | Drako |
| 2003/0097589 | A1 | 5/2003 | Syvanne |
| 2004/0017814 | A1 | 1/2004 | Shimada |
| 2005/0182937 | A1 * | 8/2005 | Bedi .............................. 713/171 |
| 2006/0013158 | A1 | 1/2006 | Ahuja et al. |
| 2006/0212601 | A1 | 9/2006 | Hampton |
| 2007/0055749 | A1 | 3/2007 | Chien |
| 2008/0049779 | A1 | 2/2008 | Hopmann et al. |
| 2008/0089241 | A1 * | 4/2008 | Lloyd et al. ................... 370/253 |
| 2010/0036959 | A1 | 2/2010 | Trace et al. |
| 2010/0107240 | A1 * | 4/2010 | Thaler et al. .................... 726/15 |
| 2010/0186079 | A1 | 7/2010 | Nice et al. |
| 2011/0145316 | A1 | 6/2011 | Ait-Ameur et al. |
| 2012/0159636 | A1 | 6/2012 | Pandya et al. |

FOREIGN PATENT DOCUMENTS

| CN | 1663222 | 8/2005 |
| CN | 1666486 | 9/2005 |

(Continued)

OTHER PUBLICATIONS

James, Justin, "Deploying an Application Created with the OutSystems Agile Platform", Retrieved at << http://blogs.techrepublic.com.com/programming-and-development/?p=2708 >>, Jun. 14, 2010, pp. 6.

(Continued)

*Primary Examiner* — Thomas Dailey
(74) *Attorney, Agent, or Firm* — John Jardine; Kate Drakos; Micky Minhas

(57) ABSTRACT

A network address of a computing device is obtained, and an unencrypted request is sent to a resource access manager of a particular network. If both a response is received from the resource access manager and the computing device has a network address within a desired range of network addresses, then a determination is made that the computing device is inside the particular network. Otherwise, a determination is made that the computing device is outside the particular network.

20 Claims, 5 Drawing Sheets

(56) References Cited

FOREIGN PATENT DOCUMENTS

| CN | 1922834 | 2/2007 |
|---|---|---|
| WO | WO-0130043 | 4/2001 |

OTHER PUBLICATIONS

Shane, "Force Login Except Special IP Range WordPress Plugin", Retrieved at << http://www.bestwpthemez.com/wordpress/force-login-except-special-ip-range-wordpress-plugin-5098/ >>, Dec. 29, 2009, pp. 9.

Nancy, et al., "RBIDS- IDS with Biometric Authentication and Trace Back Scheme for Enhanced Security", Retrieved at << http://www.ijcaonline.org/journal/number3/pxc387186.pdf >>, International Journal of Computer Applications, vol. 1 No. 3, 2010, p. 35-39.

"Class IpAddressCondition", Retrieved at << http://docs.amazonwebservices.com/AWSJavaSDK/latest/javadoc/com/amazonaws/auth/policy/conditions/IpAddressCondition.html >>, Retrieved Date: Oct. 15, 2010, pp. 2.

"Branch Deployment of ISA Server 2004 Enterprise Edition", Retrieved at << http://technet.microsoft.com/en-us/library/cc302510(printer).aspx >>, Retrieved Date: Oct. 13, 2010, pp. 25.

Arends, et al., "DNS Security Introduction and Requirements", Retrieved at << http://tools.ietf.org/pdf/rfc4033.pdf >>, Mar. 2005, pp. 1-21.

Arends, et al., "Resource Records for the DNS Security Extensions", Retrieved at << http://tools.ietf.org/pdf/rfc4034.pdf >>, Mar. 2005, pp. 1-29.

Arends, et al., "Protocol Modifications for the DNS Security Extensions", Retrieved at << http://tools.ietf.org/pdf/rfc4035.pdf >>, Mar. 2005, pp. 1-53.

Mockapetris, P., "Domain Names—Concepts and Facilities", Retrieved at << http://www.ietf.org/rfc/rfc1034.txt >>, Nov. 1987, pp. 1-55.

Mockapetris, P., "Domain Names—Implementation and Specification", Retrieved at << http://tools.ietf.org/pdf/rfc1035.pdf >>, Nov. 1987, pp. 1-55.

Sseshad., "DNSSEC on Windows 7 DNS client", Retrieved at << http://blogs.technet.com/b/sseshad/archive/2008/11/11/dnssec-on-windows-7-dns-client.aspx >>, Nov. 11, 2008, pp. 2.

Atkins, et al., "Threat Analysis of the Domain Name System (DNS)", Retrieved at << http://tools.ietf.org/html/rfc3833 >>, Aug. 2004, pp. 1-33.

Davies, Joseph., "The Name Resolution Policy Table", Retrieved at << http://technet.microsoft.com/en-us/magazine/ff394369.aspx >>, Feb. 2010, pp. 5.

Shinder, Deb., "Getting to Know the Windows Server 2008 R2 Name Resolution Policy Table (NRPT)", Retrieved at << http://www.windowsnetworking.com/articles_tutorials/Getting-Know-Windows-Server-2008-R2-Name-Resolution-Policy-Table-NRPT.html >>, Feb. 18, 2010, pp. 1-15.

Sorce, et al., "A DNS RR for IP based Location Discovery (Draft)", Retrieved at << http://www.freeipa.org/page/DNS_Location_Discovery >>, Retrieved Date: Oct. 12, 2010, pp. 1-6.

"Discover DNSSEC", Retrieved at << http://www.verisign.com/domain-name-services/domain-information-center/dnssec-resource-center/overview/index.html >>, Retrieved Date: Oct. 12, 2010, pp. 2.

"International Search Report", Mailed Date—Aug. 28, 2012, Application No. PCT/US2011/065277, Filed Date—Dec. 15, 2011, pp. 9.

"Non-Final Office Action", U.S. Appl. No. 12/970,371, (Aug. 15, 2012), 12 pages.

"Final Office Action", U.S. Appl. No. 12/970,371, (Jan. 30, 2013), 15 pages.

"Foreign Office Action", Chinese Application No. 201110423043.7, Oct. 31, 2013, 11 pages.

"Non-Final Office Action", U.S. Appl. No. 12/970,371, Jul. 29, 2014, 15 pages.

"Foreign Office Action", CN Application No. 201110423043.7, Jul. 14, 2014, 15 Pages.

* cited by examiner

DETERMINING WHETHER A DEVICE IS INSIDE A NETWORK

BACKGROUND

Many computing devices are mobile devices that can be easily transported to different locations. These mobile devices can sometimes operate in different manners based on whether they are considered to be inside a particular network. However, it can be difficult to reliably determine when a mobile device is inside a particular network at any particular time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a network address of a computing device is obtained. A check is made as to whether the network address is within a desired range of network addresses and/or whether a resource access manager for a particular network can be accessed. A determination is made that the computing device is inside the particular network if both the network address is within the desired range of network addresses and the resource access manager can be accessed, otherwise a determination is made that the computing device is outside the particular network.

In accordance with one or more aspects, a computing device sends an unencrypted request to a resource access manager of a particular network. If both a response is received from the resource access manager and the computing device has a network address within a desired range of network addresses, then a determination is made that the resource access manager can be accessed and that the computing device is inside the particular network. Otherwise, a determination is made that the resource access manager cannot be accessed and that the computing device is outside the particular network.

BRIEF DESCRIPTION OF THE DRAWINGS

The same numbers are used throughout the drawings to reference like features.

DETAILED DESCRIPTION

Figure 1:
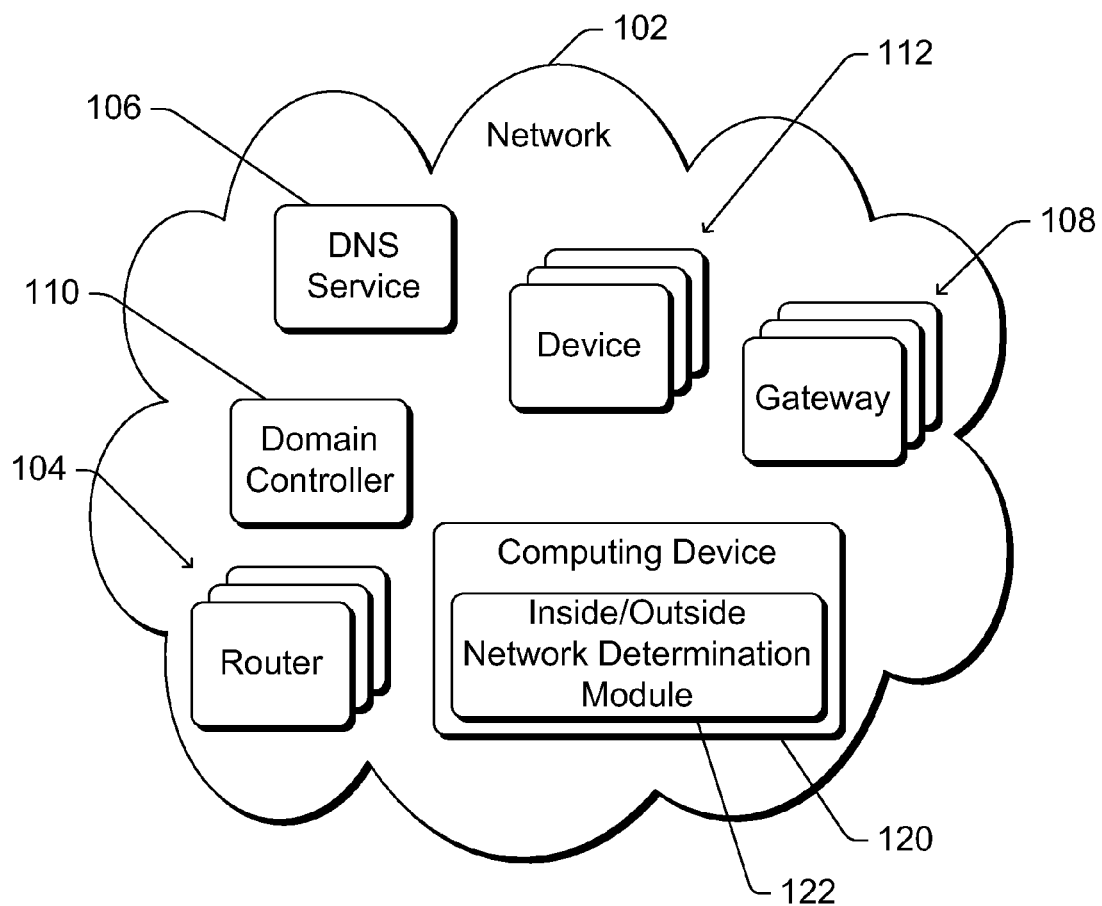
FIG. 1 illustrates an example system implementing the determining whether a device is inside a network in accordance with one or more embodiments.

Determining whether a device is inside a network is discussed herein. A computing device obtains a network address and attempts to access a resource access manager (e.g., a domain controller) of a particular network (e.g., a corporate network). The computing device determines that it is inside that particular network if the network address of the computing device is within a range of addresses that can be assigned to devices inside that particular network and the resource access manager of the particular network can be accessed. Otherwise, the computing device determines that it is outside the particular network.

References are made herein to encryption, symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

FIG. 1 illustrates an example system 100 implementing the determining whether a device is inside a network in accordance with one or more embodiments. System 100 includes a network 102, which is one or more devices coupled together via a communication network. The communication network can include wired and/or wireless communications, and allows various ones of the devices in network 102 to communicate with various other devices in network 102. The communication network can be, for example, a local area network (LAN), a public telephone network, a private telephone network, other public and/or proprietary networks, combinations thereof, and so forth.

Network 102 includes various devices, including one or more routers 104, one or more devices implementing a domain name system (DNS) service 106, one or more gateways 108, one or more devices implementing a domain controller 110, and one or more other devices 112. Routers 104 route data packets or other information among the various devices of network 102. Gateways 108 manage connecting network 102 to other networks (e.g., the Internet) or other devices outside network 102. Communications from devices inside network 102 to devices outside network 102, as well as communications from devices outside network 102 to devices inside network 102, are managed by gateway 108.

DNS service 106 resolves names to network addresses, mapping a particular name (e.g., domain name) to a corresponding network address that can be used by another device (e.g., computing device 120) to access a particular device or service. This mapping of a domain name to a corresponding network address is also referred to as DNS resolution In one or more embodiments, DNS service 106 implements a DNS system in compliance with the well-known DNS protocol (e.g., as discussed in Network Working Group Request for Comments 1034 (November 1987) and in Network Working Group Request for Comments 1035 (November 1987)). Alternatively, DNS service 106 can implement other systems or protocols that perform similar functionality.

Devices 112 can be a variety of different types of devices, including computing devices such as a desktop computer, a server computer, a laptop or netbook computer, a tablet or notepad computer, a mobile station, a database or other storage device, an entertainment appliance, a set-top box communicatively coupled to a display device, a television or other display device, a cellular or other wireless phone, a game console, an automotive computer, and so forth. Devices 112 can also be various types of input devices, such as a scanner, a camera or other image capture device, and so forth. Devices 112 can also be various types of output devices, such as printers, facsimile machines, projectors or other display devices, and so forth.

Domain controller 110 is a resource access manager that manages authenticating users (or devices) and access permissions for devices in network 102. Domain controller 110 allows users to log in and authenticate themselves to domain controller 110, and gain access to one or more domains or other collections of devices in network 102. Although the determining whether a device is inside a network techniques discussed herein refer to a domain controller (e.g., domain controller 110), it should be noted that other types of resource access managers can alternatively be used in place of domain controllers. These resource access managers can manage access permissions for different collections or groups of devices, regardless of whether such collections or groups are deemed to be part of a domain.

DNS service 106 and domain controller 110 are each typically implemented on one or more servers, although one or both of DNS service 106 and domain controller 110 can alternatively be implemented on other types of devices. DNS service 106 and domain controller 110 can be implemented on the same devices, or alternatively on different devices.

Typically network 102 includes multiple devices, including at least one router 104, at least one device implementing at least part of DNS service 106, at least one gateway 108, at least one device implementing at least part of domain controller 110, and at least one device 112. However, it should be noted that network 102 can include any number of routers 104, any number of devices implementing at least part of DNS service 106, any number of gateways 108, any number of devices implementing at least part of domain controller 110, and any number of devices 112. It should also be noted that not all such devices need be included in a network (e.g., no devices 112 may be included in a network). Additionally, it should be noted that one or more of such devices of network 102 can be combined into a single device. For example, a single device may provide the functionality of a router 104 and a gateway 108. One or more devices of network 102 also typically operates as a dynamic host configuration protocol (DHCP) server, assigning network addresses (such as Internet Protocol (IP) addresses) to devices in network 102.

In example system 100, network 102 also includes a computing device 120 having an inside/outside network determination module 122. Computing device 120 can also be one of devices 112. Computing device 120 can be a variety of different types of computing devices, such as a desktop computer, a server computer, a laptop or netbook computer, a tablet or notepad computer, a mobile station, a database or other storage device, an entertainment appliance, a set-top box communicatively coupled to a display device, a television or other display device, a cellular or other wireless phone, a game console, an automotive computer, and so forth. Computing device 120 is oftentimes a mobile computing device that can be easily moved to different locations inside network 102, as well as easily moved between locations inside network 102 and locations outside network 102, such as a cellular or other wireless phone, a laptop or notepad computer, and so forth. Thus, network 102 can include computing device 120 at times (when computing device 120 is inside network 102), and not include computing device 120 at other times (when computing device 120 is outside network 102). Although a single computing device 120 is illustrated in system 100, it should be noted that multiple computing devices 120 of the same or different types of devices can be included in network 102.

Devices included in network 102 are configured to communicate with one another via the communication network. This configuration of a device can be performed when the device is added to network 102, and can also be performed at various times after the device is already included as part of network 102. Gateway 108 permits communication between devices included in network 102 and devices that are not included in network 102 based on particular policies and/or rules. The particular policies and/or rules followed by gateway 108 can vary, based on the owner and/or designer of network 102, an administrator of network 102, and so forth.

A computing device, such as computing device 120, communicates with other devices in network 102 by connecting to network 102. Connecting to network 102 refers to establishing a communication link between the computing device and network 102. Establishing the communication link includes one or more of obtaining a network address for the computing device (e.g., assigned by a DHCP server of network 102), authenticating the computing device or a user of the computing device to a domain controller 110 (e.g., using a user name and password, using a digital certificate, etc.), negotiating a protocol with a device included as part of network 102 (e.g., with a router 104 or gateway 108), establishing a secure (e.g., encryption) communication channel with a device included as part of network 102 (e.g., gateway 108), and so forth.

Establishing of a communication link between the computing device and network 102 can be initiated by the computing device or another device (e.g., a device included as part of network 102). Once the communication link is established, the computing device can communicate with other devices in network 102 (subject to any access control policies in place in network 102).

A device, such as computing device 120, can be referred to as being inside a network or outside a network. A device that is inside (also referred to as internal to) a network is a device that is included in the network and thus is able to communicate with other devices included in that network without having to access devices outside that network. Thus, for example, router 104, gateway 108, device 112, devices implementing DNS service 106, and devices implementing domain controller 110 in system 100 are inside network 102 and are configured to communicate with one another via the communication network of network 102 without accessing devices outside network 102. Devices inside network 102 can communicate with other devices that are not inside network 102 by way of gateway 108. It should also be noted that although devices inside network 102 can communicate with one another via the communication network, various access control restrictions on which (or the manner in which) devices inside network 102 can access which other devices inside network 102 can be implemented.

A device that is outside (also referred to as external to) a network is a device that is not inside that network. Such a device can communicate with devices inside that network by way of a gateway of that network. Thus, for example, router 104, gateway 108, device 112, devices implementing DNS service 106, and devices implementing domain controller 110 can receive communications from (and send communications to) devices outside network 102 via gateway 108, subject to the policies and/or rules used by gateway 108.

Which devices are included in network 102 can be defined in different manners, and can be based at least in part on the desires of an entity implementing network 102 and/or an administrator of network 102. In one or more embodiments, network 102 is defined by the devices served by DNS service 106. Devices inside network 102 submit DNS queries to, and receive DNS responses from, DNS service 106. A device outside network 102 is unable to access DNS service 106 (e.g., the policies and/or rules used by gateway 108 prevent the device from accessing DNS service 106).

In one or more other embodiments, network 102 is defined by the devices that are able to access one another without communications passing through a firewall (e.g., implemented by gateway 108 or another device) or accessing the Internet. Devices inside network 102 are those devices that can access one another (subject to any access control policies in place in network 102) without communications passing through the firewall or accessing the Internet. Devices that communicate with devices inside network 102 by way of the firewall or Internet are outside network 102.

Additionally, in one or more embodiments network 102 is a network that is administered by or for a particular business entity (e.g., a particular company, a particular division or unit of a company, etc.), and thus is referred to as a corporate network. Alternatively, network 102 can be other types of networks, such as a home network, an educational network, a gaming network, and so forth.

In the example of system 100, computing device 120 is inside network 102. However, situations can arise in which computing device 120 becomes outside the network. For example, computing device 120 can be moved to a different location at which computing device 120 is unable to establish a communication link with network 102 in a manner that would make computing device 120 inside network 102. It should be noted that, throughout its use, computing device 120 can be moved between being inside network 102 and outside network 102 numerous times.

Figure 2:
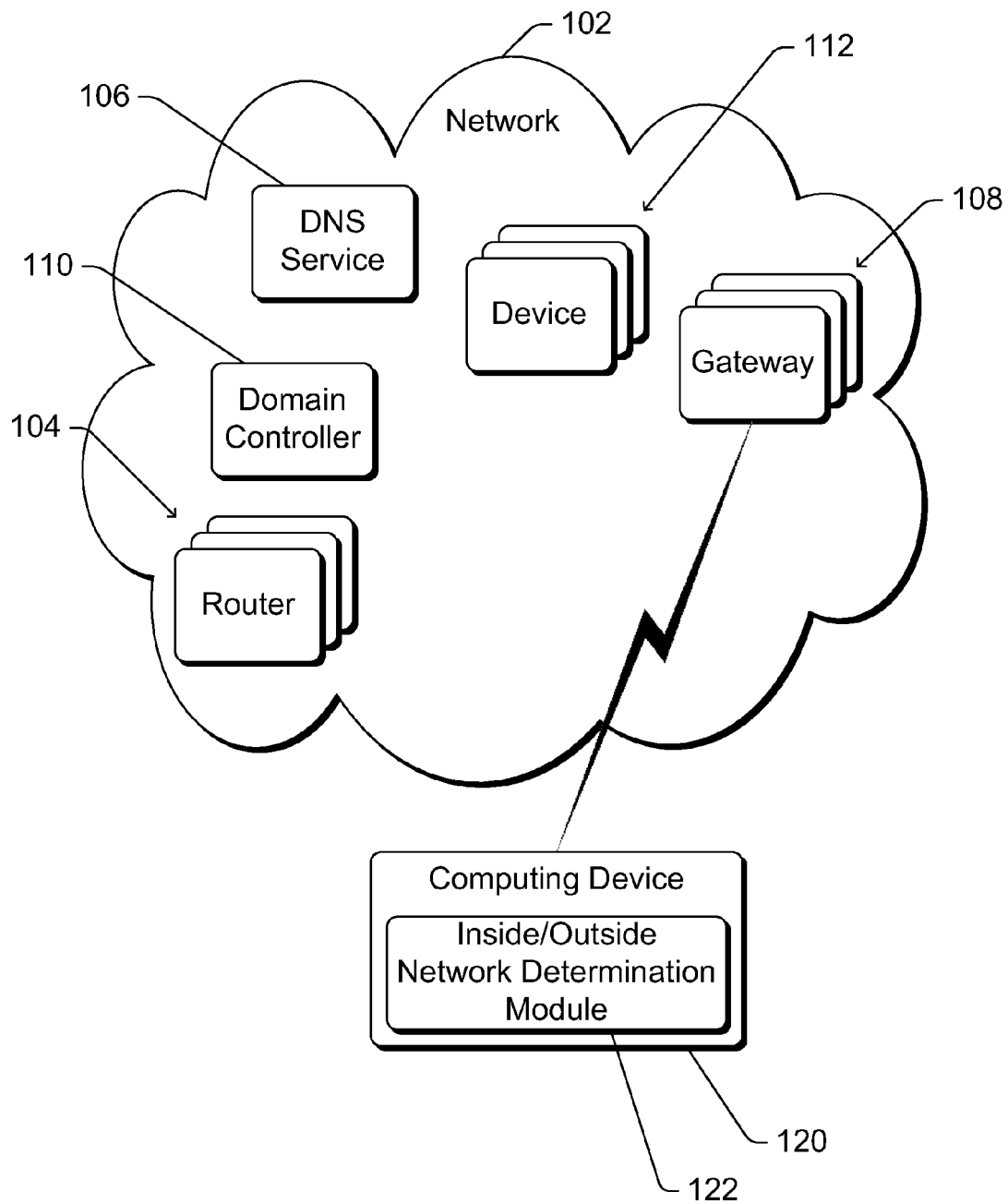
FIG. 2 illustrates another example system implementing the determining whether a device is inside a network in accordance with one or more embodiments.

FIG. 2 illustrates another example system 200 implementing the determining whether a device is inside a network in accordance with one or more embodiments. System 200 is similar to system 100 of FIG. 1, including network 102, one or more routers 104, a DNS service 106, one or more gateways 108, a domain controller 110, and one or more other devices 112. System 200 also includes computing device 120. Although a single computing device 120 is illustrated in system 200, it should be noted that multiple computing devices 120 of the same or different types of devices can be included in system 200.

Computing device 120 of FIG. 2 is computing device 120 of FIG. 1. In FIG. 1, computing device 120 is included inside network 102. However, in FIG. 2 computing device 120 is outside network 102 and establishes a communication link with network 102 via gateway 108. A communication link can be established between computing device 120 and gateway 108 via a variety of other devices or communication networks, such as via the Internet, via a cellular or other public network, and so forth.

Computing device 120 can operate in different manners based on whether computing device 120 determines it is inside network 102 or outside network 102. For example, computing device 120 may determine whether to use encrypted communication based on whether computing device 120 is inside network 102, computing device 120 may enable or disable certain functionality based on whether computing device 120 is inside network 102, computing device 120 may permit or deny access to files stored on computing device 120 based on whether computing device 120 is inside network 102, and so forth. Computing device 120 can optionally make various other determinations or perform various other operations or functions based on whether computing device 120 is inside network 102, e.g., based on the design of computing device 120 and/or software or firmware running on computing device 120.

Computing device 120 includes inside/outside network determination module 122, which determines whether computing device 120 is inside network 102 or outside network 102 at any particular time. Generally, inside/outside network determination module 122 determines whether computing device 120 is inside network 102 or outside network 102 based on both whether computing device 120 can access domain controller 110 and whether computing device 120 is assigned a network address in a desired range of addresses. If computing device 120 can access domain controller 110 and computing device 120 is assigned a network address in a desired range of addresses, then inside/outside network determination module 122 determines that computing device 120 is inside network 102. However, if computing device 120 cannot access domain controller 110 and/or computing device 120 is not assigned a network address in that desired range of addresses, then inside/outside network determination module 122 determines that computing device 120 is outside network 102.

Computing device 120 typically obtains a network address from another device or service (e.g., assigned by a DHCP server), and uses this network address as the network address of computing device 120. The network addresses discussed herein can be IP version 4 (IPv4) network addresses, IP version 6 (IPv6) network addresses, Intra-Site Automatic Tunnel Addressing Protocol (ISATAP) addresses, and so forth. A module or component of computing device 120 obtains the network address from another device or service. This module or component can be part of an operating system of computing device 120, part of a network interface card or chip, inside/outside network determination module 122, and so forth.

Inside/outside network determination module 122 obtains the network address of computing device 120. Inside/outside network determination module 122 can obtain the network address of computing device 120 from another device or service as discussed above, or from another component or module of computing device 120 (which obtains, or previously obtained, the network address of computing device 120 from another device or service).

Inside/outside network determination module 122 checks the network address assigned to computing device 120 and determines whether this network address of computing device 120 is within a desired range of network addresses. The desired range of network addresses is one or more network addresses that can be assigned to devices inside network 102 (e.g., one or more corporate network addresses that can be assigned to devices in a corporate network). Network addresses can be assigned to devices inside network 102 in a variety of different manners, such as by a DHCP server of network 102, by an administrator of network 102, and so forth.

Inside/outside network determination module 122 also knows what this desired range of network addresses is. Inside/outside network determination module 122 can be configured with an indication of the desired range of network addresses, can obtain an indication of the desired range of network addresses from another device or service, or can otherwise obtain an indication of the desired range of network addresses. Thus, inside/outside network determination module 122 can readily determine whether the network address of computing device 120 is within the desired range of network addresses (e.g., is a network address included in the desired range of network addresses).

If the network address of computing device 120 is not within the desired range of network addresses, then inside/outside network determination module 122 determines that computing device 120 is outside network 102. However, if the network address of computing device 120 is within the desired range of network addresses, then inside/outside network determination module 122 checks whether domain controller 110 can be accessed by computing device 120. Inside/outside network determination module 122 typically checks whether domain controller 110 can be accessed by computing device 120 after determining that the network address of computing device 120 is within the desired range of network addresses. Alternatively, inside/outside network determination module 122 can check whether domain controller 110 can be accessed by computing device 120 before (or concurrently with) determining whether the network address of computing device 120 is within the desired range of network addresses.

Inside/outside network determination module 122 checks whether domain controller 110 can be accessed by attempting to contact domain controller 110. Inside/outside network determination module 122 can attempt to contact domain controller 110 by causing one or more of a variety of different requests to be sent to domain controller 110, such as a request to be authenticated by domain controller 110, a request for information or data from domain controller 110, and so forth. Inside/outside network determination module 122 can cause such requests to be sent to domain controller 110 by addressing requests to a network address of domain controller 110 (which could be a network address of a device implementing domain controller 110). Module 122 can be configured with the network address of domain controller 110, or can otherwise obtain the network address of domain controller 110 (e.g., from a DNS server or gateway 108). Inside/outside network determination module 122 can cause such requests to be sent to domain controller 110 by module 122 sending such requests or alternatively causing another component or module of computing device 120 to send such requests to domain controller 110.

Communications among devices inside of network 102 are typically not encrypted, however communications between gateway 108 and devices outside network 102 can be encrypted. Specifically, gateway 108 expects requests directed to domain controller 110 from a computing device 120 outside network 102 and connected to network 102 to be encrypted. A device outside network 102 can use encryption, including symmetric key cryptography and/or public key cryptography, to establish a secure channel with gateway 108 in a variety of different conventional manners.

If the network address of computing device 120 is within the desired range of network addresses, then inside/outside network determination module 122 sends one or more unencrypted (e.g., plaintext) requests in an attempt to contact domain controller 110. Inside/outside network determination module sends such unencrypted requests regardless of whether computing device 120 is actually inside network 102 or outside network 102. If computing device 120 is inside network 102, then the unencrypted requests will be received by domain controller 110, which will return an appropriate response. The particular response returned by domain controller 110 can vary, being based at least in part on the particular request that was sent to domain controller 110. Inside/outside network determination module 122 determines that domain controller 110 can be accessed by computing device 120 if a response is received from domain controller 110.

However, if computing device 120 is outside network 102, then the one or more unencrypted requests will be received by gateway 108. Gateway 108 is configured with one or more policies and/or rules, one of which is that requests to domain controller 110 from a computing device outside network 102 are to be encrypted (e.g., received via a secure channel). Gateway 108 can readily determine if a request is received from a device outside network 102 (e.g., based on a communication link via which the request is received). Accordingly, if gateway 108 receives a request to domain controller 110 from a computing device outside network 102, gateway 108 does not provide the request to domain controller 110. Gateway 108 can drop or otherwise ignore the request, or return an indication to the computing device from which the request was received that there is an error or other problem with the request. Thus, if computing device 120 sends an unencrypted request in an attempt to contact domain controller 110 when outside network 102, the request will not be provided to domain controller 110 and no response from domain controller 110 will be received. Inside/outside network determination module 122 determines that domain controller 110 cannot be accessed by computing device 120 if no response is received from domain controller 110.

Thus, if computing device 120 is inside network 102, then the network address of computing device 120 is within the desired range of network addresses and domain controller 110 can be accessed. Accordingly, inside/outside network determination module 122 determines that computing device 120 is inside network 102.

On the other hand, if computing device 120 is outside network 102, then the network address of computing device 120 is typically not within the desired range of network addresses. Accordingly, inside/outside network determination module 122 determines that computing device 120 is outside network 102.

However, situations may arise in which computing device 120, even though outside network 102, is given a network address that is within the desired range of network addresses. Such situations can arise due to an error, coincidence, actions of a malicious user or program, and so forth. If computing device 120 is outside network 102, then domain controller 110 cannot be accessed (using unencrypted requests) as discussed above. Thus, inside/outside network determination module 122 determines that computing device 120 is outside network 102, even though the network address of computing device 120 is within the desired range of network addresses.

It should be noted that even though computing device 120 may be outside network 102, computing device 120 can still access devices in network 102 via gateway 108. Thus, computing device 120 can access domain controller 110 if requests to domain controller 110 are encrypted (e.g., sent via a secure channel between computing device 120 and gateway 108).

In one or more embodiments, all requests sent from computing device 120 (or from inside/outside network determination module 122) to a device implementing at least part of domain controller 110 are unencrypted. Thus, even if a secure channel has been established between computing device 120 and gateway 108, requests sent to domain controller 110 are exempted from being, and are not, sent via that secure channel. Alternatively, only particular requests sent from computing device 120 (or from inside/outside network determination module 122) to a device implementing at least part of domain controller 110 are unencrypted requests. For example, only requests sent to DNS and/or Lightweight Directory Access Protocol (LDAP) ports (e.g., User Datagram Protocol (UDP) port 53 and Transmission Control Protocol (TCP) port 389) of domain controller 110 are unencrypted requests. These particular requests are exempted from being sent via the secure channel with gateway 108, whereas other requests from computing device 120 (or from inside/outside network determination module 122) sent to devices implementing at least part of domain controller 110 (e.g., sent to other ports of domain controller 110) are encrypted and sent via the secure channel with gateway 108.

In one or embodiments, requests that are exempted from being sent via a secure channel between computing device 120 and gateway 108 are exempted for only a particular amount of time (e.g., the time during which inside/outside network determination module 122 is determining whether computing device 120 is inside or outside network 102). Requests sent by computing device 120 at other times, and/or requests sent by modules other than inside/outside network determination module 122, are not exempted and thus are encrypted (e.g., sent via the secure channel with gateway 108).

Figure 3:
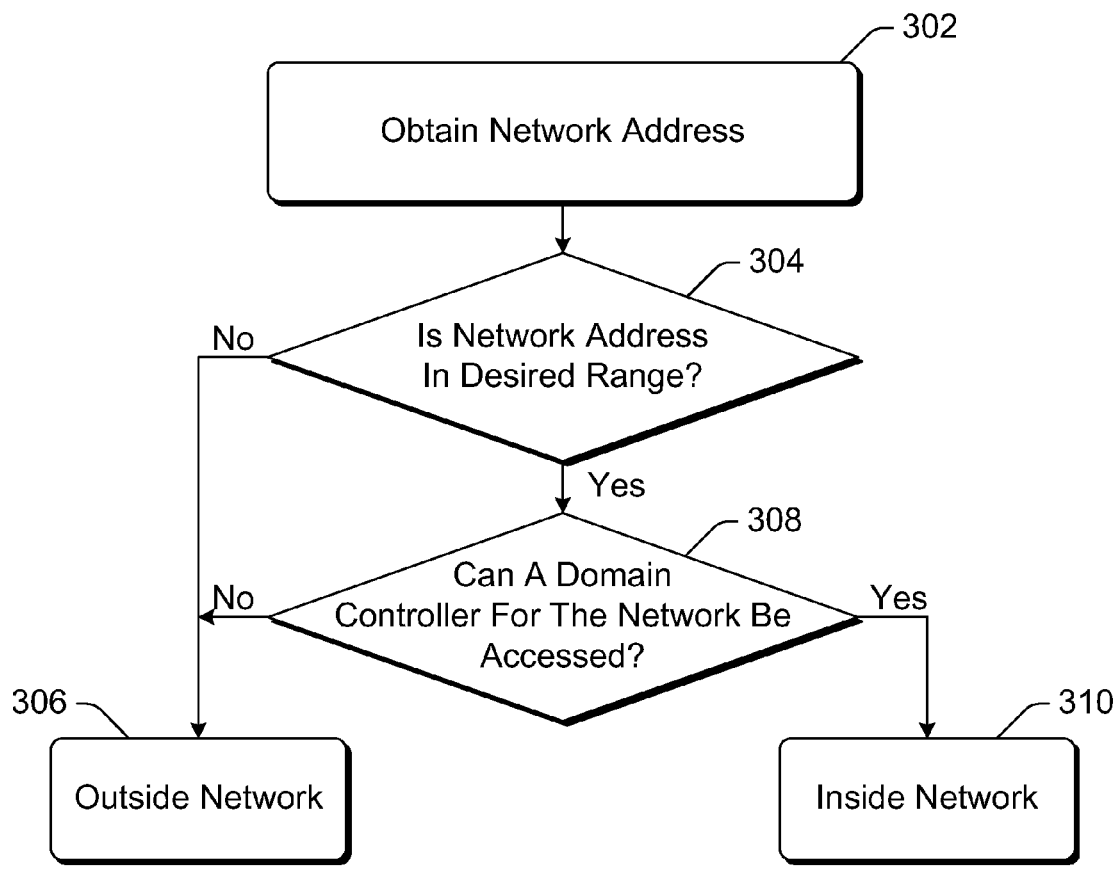
FIG. 3 is a flowchart illustrating an example process for a computing device determining whether it is inside or outside a particular network in accordance with one or more embodiments.

FIG. 3 is a flowchart illustrating an example process 300 for a computing device determining whether it is inside or outside a particular network in accordance with one or more embodiments. Process 300 can be implemented in software, firmware, hardware, or combinations thereof. Process 300 is carried out by a computing device, such as computing device 120 of FIGS. 1 and 2, and typically by an inside/outside network determination module on that computing device (such as module 122 of FIGS. 1 and 2). Process 300 is shown as a set of acts and is not limited to the order shown for performing the operations of the various acts. Process 300 is an example process for a computing device determining whether it is inside or outside a particular network; additional discussions of a computing device determining whether it is inside or outside a particular network are included herein with reference to different figures.

In process 300, a network address is obtained (act 302). This network address is a network address assigned to the computing device implementing process 300, and can be obtained in a variety of different manners as discussed above.

A check is made as to whether the network address obtained in act 302 is within the desired range of network addresses (act 304). This desired range of network addresses is the set of one or more network addresses that can be assigned to devices inside a particular network, as discussed above.

If the network address is not within the desired range of network addresses, then a determination is made that the computing device implementing process 300 is outside that particular network (act 306). This determination is made by an inside/outside network determination module of the computing device implementing process 300 as discussed above.

However, if the network address is within the desired range of network addresses, then a check is made as to whether a domain controller for the particular network can be accessed (act 308). This check can be made by sending various requests to a domain controller inside the particular network as discussed above.

If the domain controller for the particular network cannot be accessed, then a determination is made that the computing device implementing process 300 is outside that particular network (act 306).

However, if the domain controller for the particular network can be accessed then a determination is made that the computing device implementing process 300 is inside that particular network (act 310). This determination is made by an inside/outside network determination module of the computing device implementing process 300 as discussed above.

The determination of whether the computing device is inside the particular network or outside the particular network can then be forwarded to or otherwise made available to various other components or modules of the computing device. These other components or modules can then proceed operate in various manners as appropriate based on whether the computing device is inside the particular network or outside the particular network.

Process 300 can be repeated at particular intervals, including regular or irregular intervals. For example, process 300 can be performed approximately every five minutes, approximately hourly, and so forth. By way of another example, process 300 can be performed in response to particular events, such as in response to the computing device resuming operation from a reduced power mode (e.g., from a sleep or hibernate mode), in response to movement of the computing device by greater than a threshold amount (e.g., 100 yards, 1 mile, and so forth) being detected (e.g., by a global positioning system (GPS) of the computing device), in response to arrival or removal of a network interface of the computing device (e.g., a network interface of the computing device being enabled), in response to the computing device determining the computing device is within range of a new wireless network or no longer within range of a wireless network it was previously within range of, and so forth.

Figure 4:
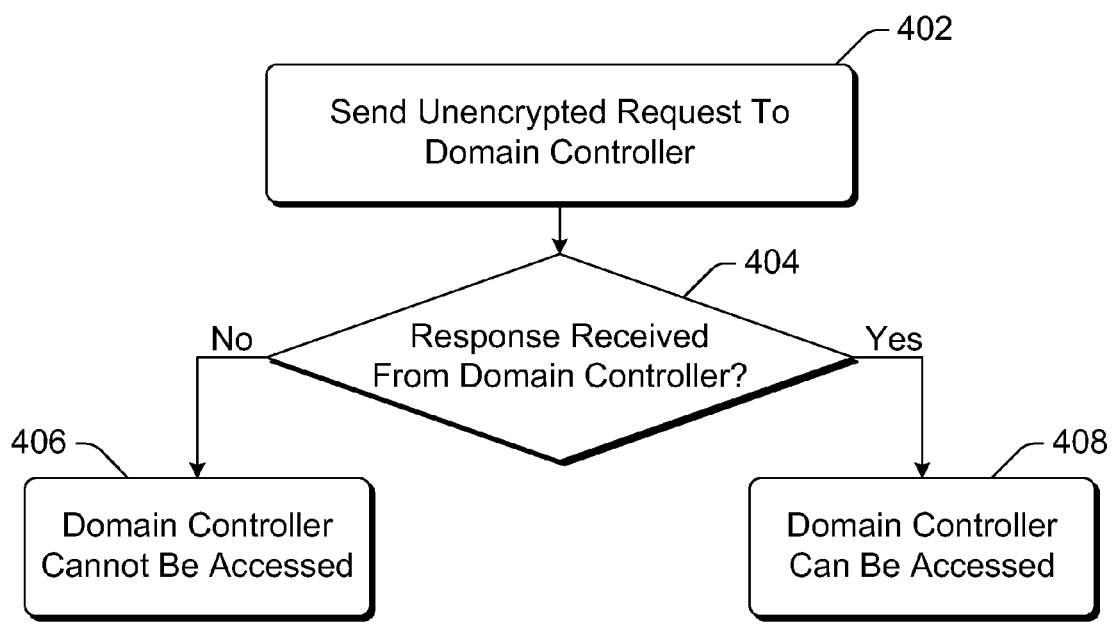
FIG. 4 is a flowchart illustrating an example process for a computing device determining whether a domain controller can be accessed in accordance with one or more embodiments.

FIG. 4 is a flowchart illustrating an example process 400 for a computing device determining whether a domain controller can be accessed in accordance with one or more embodiments. Process 400 can be implemented in software, firmware, hardware, or combinations thereof. Process 400 is carried out by a computing device, such as computing device 120 of FIGS. 1 and 2, and typically by an inside/outside network determination module on that computing device (such as module 122 of FIGS. 1 and 2). Process 400 can be, for example, act 308 of FIG. 3. Process 400 can thus be performed after a determination is made that the computing device is assigned a network address within a desired range of network addresses. Process 400 is shown as a set of acts and is not limited to the order shown for performing the operations of the various acts. Process 400 is an example process for a computing device determining whether a domain controller can be accessed; additional discussions of a computing device determining whether a domain controller can be accessed are included herein with reference to different figures.

In process 400, an unencrypted request is sent to a domain controller of a particular network (act 402). This unencrypted request is not sent via a secure channel between the computing device implementing process 400 and a gateway of the particular network, even if the computing device is outside the particular network.

A check is made as to whether a response is received from the domain controller (act 404). If no response is received from the domain controller within a threshold amount of time (e.g., 5 seconds, 20 seconds, and so forth), then the determination is made that no response is received from the domain controller. Acts 402 and 404 can optionally be repeated multiple times, with multiple unencrypted requests being sent to the domain controller in an attempt to obtain a response from a domain controller.

If no response to the request sent in act 402 is received from the domain controller, then a determination is made that the domain controller cannot be accessed (act 406). However, if a response to the request sent in act 402 is received from the domain controller, then a determination is made that the domain controller can be accessed (act 408).

Returning to FIGS. 1 and 2, it should be noted that although a single network 102 is illustrated, the determining whether a device is inside a network techniques discussed herein can be used with multiple different networks. Computing device 120 can be configured with, or otherwise obtain, an indication of the desired ranges of network addresses as well as the domain controllers for each of a variety of different networks. Inside/outside network determination module 122 can thus readily determine, at any particular time, whether computing device 120 is inside or outside any one of those different networks.

Additionally, it should be noted that although inside/outside network determination module 122 is shown as being part of computing device 120, alternatively various functionality of inside/outside network determination module 122 can be implemented on other devices. For example, computing device 120 can communicate with one or more other devices or services, which can be part of network 102 or another network, that can perform various aspects of the determining whether a device is inside a network techniques discussed herein.

Thus, the determining whether a device is inside a network techniques discussed herein allow a computing device to accurately and reliably determine whether the computing device is inside a particular network at any particular time. By leveraging the domain controller, the determining whether a device is inside a network techniques discussed herein use an existing reliable system for making the determination. Domain controllers are already operating as a reliable system, providing replication, backup, and so forth as appropriate to maintain a high degree of availability of the domain controller functionality. Thus, an additional reliable system with a high degree of availability need not be built and maintained in order to implement the determining whether a device is inside a network techniques discussed herein.

Furthermore, the determining whether a device is inside a network techniques discussed herein operate in various different types of network deployments. For example, the determining whether a device is inside a network techniques discussed herein can be used with Internet Protocol (IP) version 4 (IPv4) network addresses, IP version 6 (IPv6) network addresses, Intra-Site Automatic Tunnel Addressing Protocol (ISATAP) addresses and mechanisms, other protocols and/or mechanisms, combinations thereof, and so forth.

The determining whether a device is inside a network techniques discussed herein support a variety of different usage scenarios. For example, a computing device can operate in an "always on" access mode in which the computing device maintains connectivity to a particular network (e.g., a corporate network) despite being moved to different locations varying between inside the particular network and outside the particular network. The computing device can continue operation, determining whether the computing device is inside or outside the network at any particular time, and operating in different manners as appropriate based on this determination.

Figure 5:
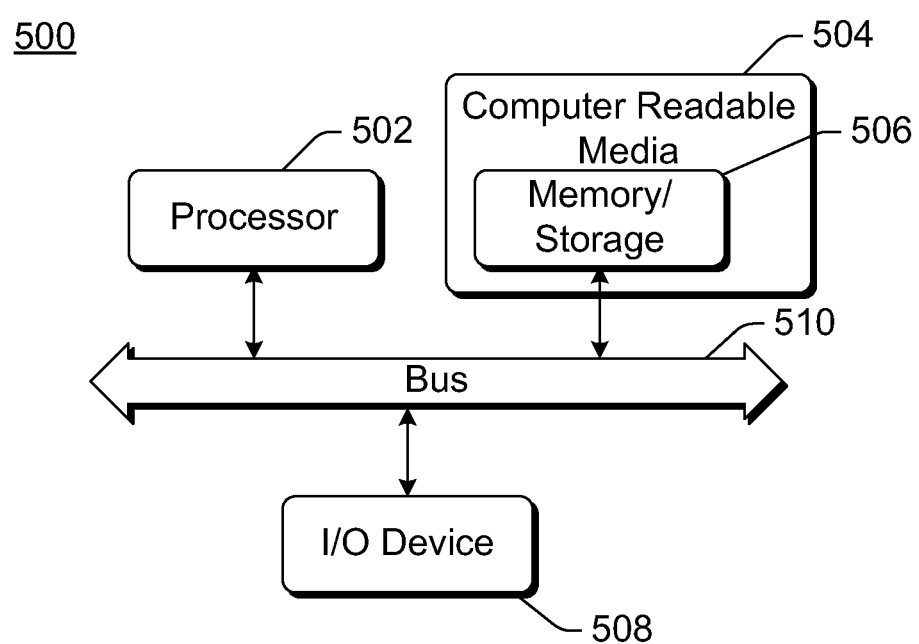
FIG. 5 illustrates an example computing device that can be configured to implement the determining whether a device is inside a network in accordance with one or more embodiments.

FIG. 5 illustrates an example computing device 500 that can be configured to implement the determining whether a device is inside a network in accordance with one or more embodiments. Computing device 500 can be, for example, a computing device 120 of FIGS. 1 and 2, or one or more of a router 104, gateway 108, and/or device 112 of FIGS. 1 and 2, or one or more of a device implementing at least part of DNS service 106 and/or at least part of domain controller 110 of FIGS. 1 and 2.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, applications, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the determining whether a device is inside a network techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   obtaining, using a computing device, a network address assigned to the computing device;
   checking, using the computing device, one or both of whether the network address is within a desired range of network addresses and whether a resource access manager for a particular network can be accessed, the checking further comprising:
     causing a request to be sent to the resource access manager, wherein the request is an unencrypted request regardless of whether the computing device is inside the particular network or outside the particular network, and wherein the unencrypted request is an unencrypted request to a domain name system (DNS) or a lightweight directory access protocol (LDAP) port of the resource access manager, and other requests sent to other ports of the resource access manager are encrypted requests;
     checking whether a response to the request is received from the resource access manager; and
     determining that the resource access manager can be accessed if the response to the request is received from the resource access manager, otherwise determining that the resource access manager cannot be accessed;
   determining that the computing device is inside the particular network if both the network address is within the desired range of network addresses and the resource access manager can be accessed, otherwise determining that the computing device is outside the particular network; and
   repeating the obtaining, the checking, and the determining at particular intervals.

2. A method as recited in claim 1, wherein the resource access manager comprises a domain controller for the particular network.

3. A method as recited in claim 1, further comprising checking whether the resource access manager can be accessed only if the network address is within the desired range of network addresses, otherwise determining that the computing device is outside the particular network regardless of whether the resource access manager can be accessed.

4. A method as recited in claim 1, wherein the desired range of network addresses is a range of corporate network addresses.

5. A method as recited in claim 1, wherein the particular network comprises a corporate network.

6. A method as recited in claim 1, wherein the network address comprises an Internet protocol (IP) address.

7. One or more computer hardware storage media having stored thereon multiple instructions that, when executed by one or more processors of a computing device, cause the one or more processors to:
   send an unencrypted request to a gateway of a resource access manager of a particular network but encrypt other requests sent to the gateway to access other devices in the particular network, wherein the request is an unencrypted request regardless of whether the computing device is inside the particular network or outside the particular network, and wherein the unencrypted request is an unencrypted request to a domain name system (DNS) or a lightweight directory access protocol (LDAP) port of the resource access manager;
   if both a response is received from the resource access manager and the computing device is assigned a network address within a desired range of network addresses, then determine that the resource access manager can be accessed and that the computing device is inside the particular network, otherwise determine that the resource access manager cannot be accessed and that the computing device is outside the particular network; and
   repeat sending the unencrypted request to the resource access manager at particular intervals.

8. One or more computer storage media as recited in claim 7, wherein the resource access manager comprises a domain controller for the particular network.

9. One or more computer storage media as recited in claim 7, wherein the desired range of network addresses is a range of corporate network addresses.

10. One or more computer storage media as recited in claim 7, wherein the particular network comprises a corporate network.

11. One or more computer storage media as recited in claim 7, wherein to send the unencrypted request only is to send the unencrypted request only if the computing device is assigned network address within the desired range of network addresses, and otherwise determine that the computing device is outside the particular network regardless of whether the resource access manager can be accessed.

12. One or more computer storage media as recited in claim 7, wherein the network address comprises an Internet protocol (IP) address.

13. A method in a computing device, the method comprising:
    obtaining a network address assigned to the computing device;
    checking whether the network address is within a range of corporate network addresses of a corporate network;
    if the network address is not within the range of corporate network addresses, then determining that the computing device is outside the corporate network; and
    if the network address is within the range of corporate network addresses, then:
        checking whether a domain controller for the corporate network can be accessed by sending a request to the domain controller via a gateway of the corporate network, wherein the request is an unencrypted request regardless of whether the computing device is inside the particular network or outside the particular network, wherein the unencrypted request is an unencrypted request to a domain name system (DNS) or a lightweight directory access protocol (LDAP) port of the domain controller, and the computing device sends other requests to the gateway as encrypted requests;
        checking whether a response to the request is received from the domain controller;
        determining that the domain controller can be accessed if the response to the request is received from the domain controller, otherwise determining that the domain controller cannot be accessed; and
        determining, after checking whether the domain controller for the corporate network can be accessed, that the computing device is inside the corporate network if the domain controller can be accessed, otherwise determining that the computing device is outside the corporate network; and
    repeating the obtaining and the checking whether the network address is not within the range of corporate network addresses at particular intervals.

14. The method as recited in claim 1, wherein to be inside the network comprises communicating with one or more other devices included in the network without having to access devices outside the network.

15. The method as recited in claim 1, wherein devices outside of the network communicate with devices inside the network by way of a gateway of the network.

16. The method as recited in claim 1, wherein the computing device can be moved between being inside the network and outside the network.

17. The method as recited in claim 1, wherein communications among devices inside of the network are not encrypted.

18. One or more computer hardware storage media as recited in claim 7, wherein to be inside the network comprises communicating with one or more other devices included in the network without having to access devices outside the network.

19. One or more computer hardware storage media as recited in claim 7, wherein the computing device can be moved between being inside the network and outside the network.

20. One or more computer hardware storage media as recited in claim 7, wherein communications among devices inside of the network are not encrypted.

* * * * *